W. W. JORDAN.
BROOM CORN HARVESTING DEVICE.
APPLICATION FILED JAN. 5, 1910.
964,522.
Patented July 19, 1910.
2 SHEETS—SHEET 1.
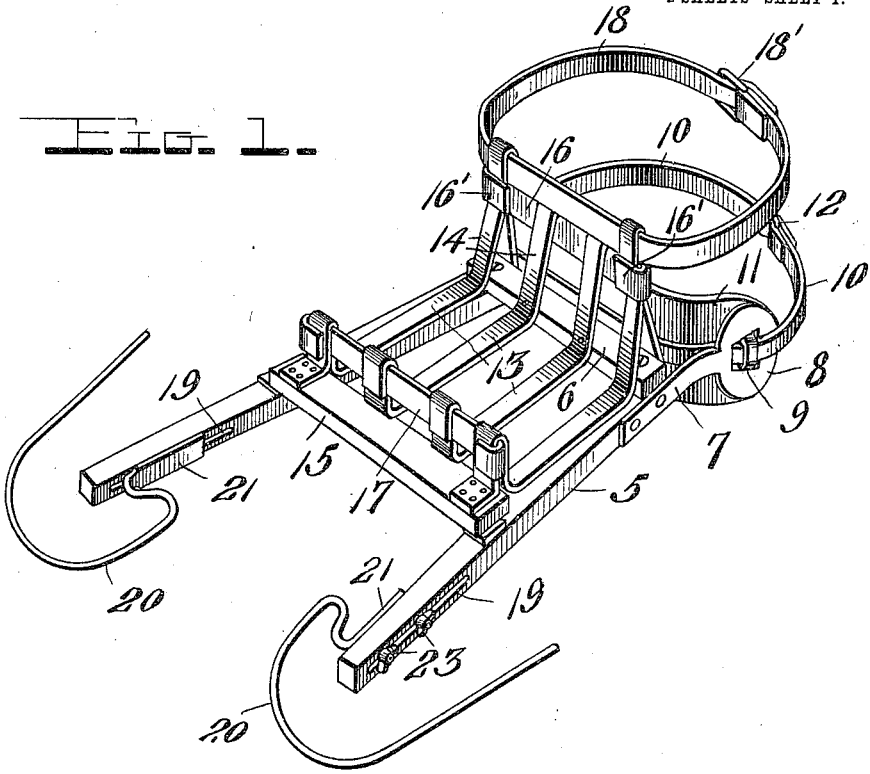
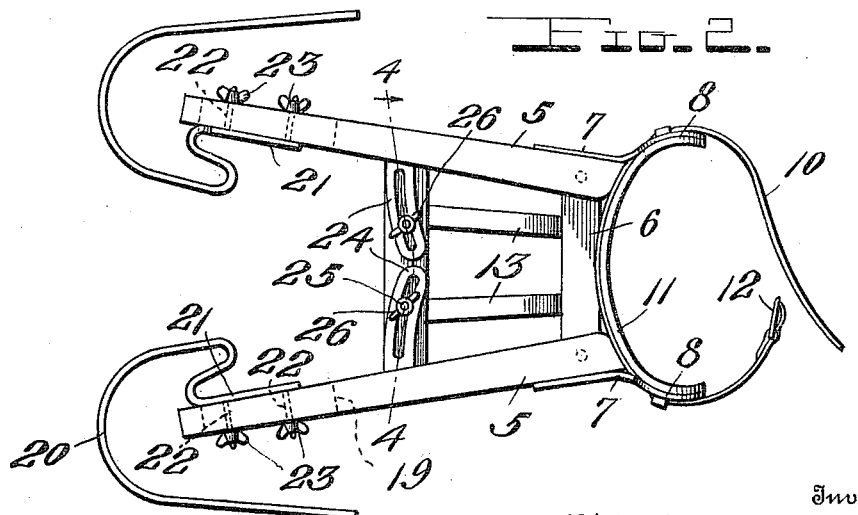
Witnesses
Chas. L. Griesbauer.
E. M. Ricketts
Inventor
W. W. Jordan,
By Watson E. Coleman
Attorney

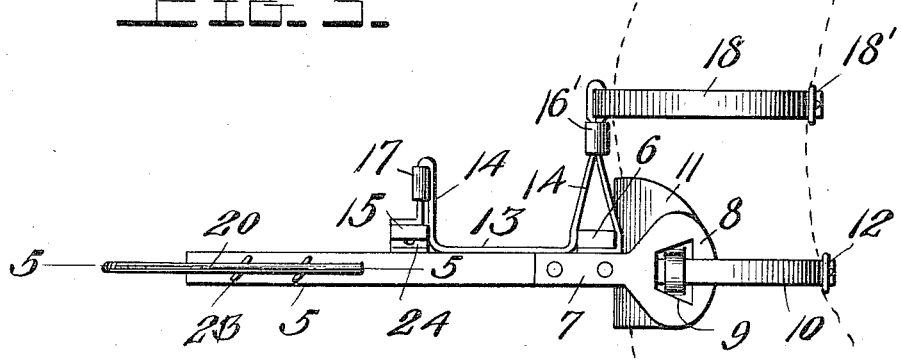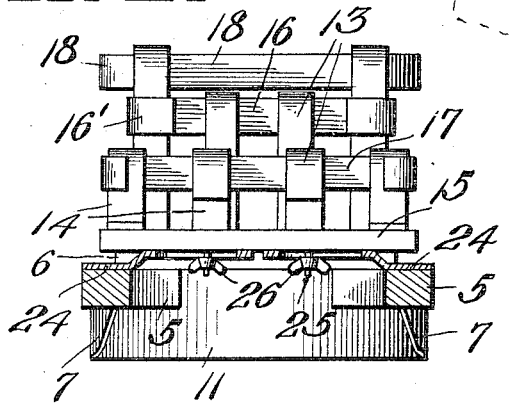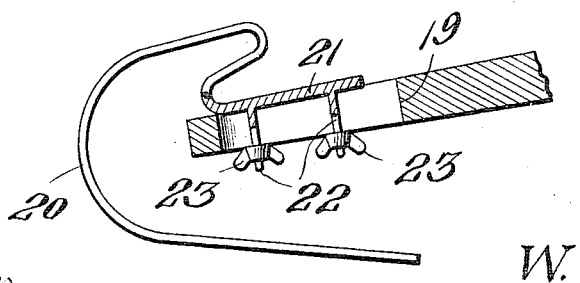

UNITED STATES PATENT OFFICE.

WILLIAM W. JORDAN, OF WYNNE WOOD, OKLAHOMA, ASSIGNOR OF ONE-HALF TO NANNIE V. FROST, OF WYNNE WOOD, OKLAHOMA.

BROOM-CORN-HARVESTING DEVICE.

964,522.   Specification of Letters Patent.   Patented July 19, 1910.

Application filed January 5, 1910. Serial No. 536,520.

*To all whom it may concern:*

Be it known that I, WILLIAM W. JORDAN, a citizen of the United States, residing at Wynne Wood, in the county of Garvin and State of Oklahoma, have invented certain new and useful Improvements in Broom-Corn-Harvesting Devices, of which the following is a specification, reference being had to the accompanying drawings.

This invention relates to certain new and useful improvements in a corn harvesting device and more particularly to a device for harvesting broom-corn which is adapted to be strapped or otherwise secured to the body of the operator and which will gather the corn in the adjacent rows and position the same within convenient reach of the operator to be cut.

A further object resides in the provision of a corn harvesting device having adjustable hook members on its forward ends and a rack or table adapted to carry the cut tops of the corn stalks.

Another object is to provide an adjustable frame whereby the hooks carried thereby may be positioned to engage with the corn in adjacent rows, when the operator moves backward between the rows, whereby the corn may be quickly gathered and cut.

With these and other objects in view, the invention consists of the novel features of construction and the combination and arrangement of parts hereinafter fully described and claimed, and illustrated in the accompanying drawings, in which—

Figure 1 is a perspective view illustrating the device in operative position; Fig. 2 is a bottom plan view; Fig. 3 is a side elevation; Fig. 4 is a section taken on the line 4—4 of Fig. 2; and Fig. 5 is a detail horizontal section taken on the line 5—5 of Fig. 3.

Referring more particularly to the drawings 5 indicates the side bars of the frame which are disposed in divergent relation and are pivoted at their rear ends to the transverse connecting bar 6. Plates 7 are secured to the outer edges of the bars at their rear ends and extend beyond the same. The extremities of the plates are enlarged, as shown at 8, and formed with the openings 9 through which a strap 10 extends. This strap is connected to a pad 11 and is provided on one end with a buckle 12 in which the other end of the strap is secured. A carrying table is arranged upon the frame and comprises a plurality of metal straps 13 which have their ends projected upwardly, as shown at 14. The forward ends of these straps are bent upon themselves and the two outer straps secured to the opposite ends of a transverse bar 15. The rear ends of the straps are also bent upon themselves and the outer straps of the table have engaged thereon adjacent to their upper ends the extremities of a transverse metal bar or plate 16. This plate is positioned rearwardly of the straps 13 and has its end portions bent over upon the same, as shown at 16'. The extremities of the intermediate longitudinal straps 13 are bent over and clenched upon the rear transverse plate 16 and the forward transverse connecting plate 17. The rear ends of the side straps of the table are secured to the transverse bar 6. These straps have secured in their upper ends above the plate 16, a fastening strap 18 which is adapted to encircle the body of the operator together with the strap 10, and is provided upon one end with a buckle 18', whereby it may be securely fastened and support the table in proper position to receive the cut corn.

The diverging side bars 5 of the frame are provided adjacent their outer ends with the longitudinal slots 19. A hook 20 formed with an inwardly extending flattened shank 21 is disposed upon the inner edges of the frame bars and carries the studs 22 which project through the slots 19 in the bars. Wing nuts 23 are threaded upon the ends of these studs and are adapted to bind against the bars 5 to secure the hooks in their adjusted position. The frame bars 5 are also adjustable with relation to each other and carry the inwardly extending transversely positioned slotted plates 24 and through these slots the depending studs 25 extend. These studs also have threaded thereon the wing nuts 26 whereby the diverging frame bars may be securely held in their adjusted positions.

In the operation of the device, the straps 10 and 18 are fastened about the body of the wearer at the waist and the hooks 19 are adjusted outwardly from the ends of the frame bars in accordance with the height of the corn whereby the corn may be engaged by the hooks and drawn forwardly toward the operator. The operator moves backwardly between the rows of corn, and the ends of the hooks engage with the same and draw the corn stalks inwardly between the hooks and the diverging frame bars, and direct the same into the inwardly extending portions of the hooks so that it may be grasped and the tops of the stalks severed by a knife wielded by the operator. The severed tops are then placed upon the table carried by the frame, and when a sufficient quantity has been gathered thereon it is removed and deposited between the corn rows. In this manner the corn may be very quickly gathered and cut and the operator is relieved of a considerable amount of manual labor which has heretofore been required in the harvesting of broom-corn. The device may be readily adjusted according to the space between the rows whereby the hooks will properly engage with the corn stalks, and the hands and arms of the operator are entirely free for the manipulation of the cutting knife.

From the foregoing it is believed that the operation and many advantages of my improved corn harvesting device will be readily apparent without requiring a more extended description.

While I have shown and described what I believe to be the preferred embodiment of the invention, it will be understood that numerous minor modifications may be resorted to without departing from the spirit or sacrificing any of the advantages thereof.

Having thus described the invention what is claimed is:

1. A device of the character described comprising adjustable diverging frame bars, a table carried thereby, means secured to said frame bars and the table to attach the same to the body of the operator, adjustable hooks carried by the outer ends of said frame bars, and means for securing the hooks in their adjusted positions, substantially as and for the purpose set forth.

2. A device of the character described comprising longitudinally extending diverging frame bars, a transverse bar pivotally connecting the diverging bars at their rear ends, a table carried by said bars, adjustable straps secured to the table and the bars adapted to encircle the body of the operator, and a rearwardly extending hook adjustably mounted on the outer end of each of said diverging bars, substantially as and for the purpose set forth.

3. A device of the character described comprising longitudinally extending, forwardly and outwardly diverging frame bars, a transverse bar pivotally connecting said diverging bars at their rear ends, means for transversely adjusting said diverging bars to increase or decrease the angle of divergence, a table carried by said frame bars, and a hook longitudinally adjustable upon the outer end of each of said bars, substantially as and for the purpose set forth.

4. A device of the character described comprising longitudinal transversely adjustable frame bars, means for securing the bars in their adjusted position, a table supported upon the rear ends of said bars, fastening straps attached to said table and to said bars adapted to encircle the body of the operator and an adjustable hook carried by the outer end of each of said bars, substantially as and for the purpose set forth.

5. A device of the character described comprising forwardly diverging frame bars, a transverse bar connecting said frame bars at their rear ends, a table supported on the rear ends of said frame bars, a transverse bar secured to the front end of said table, a slotted transversely extending plate secured to each of the frame bars, depending studs carried by the transverse bar positioned through the slots in said plates, nuts threaded upon the ends of said studs adapted to secure the frame bars in their adjusted position, a longitudinally adjustable hook on the outer end of each of said bars, and means for supporting the device in operative position upon the body of the operator, substantially as and for the purpose set forth.

6. A device of the character described comprising transversely adjustable diverging frame bars, a table supported upon the rear ends of said bars, said bars having longitudinal slots in their forward ends, a forwardly and rearwardly extending hook having a flattened shank positioned upon the inner faces of said bars, said shanks carrying studs extending through the slots therein, securing nuts threaded on the outer ends of said studs to secure the hooks in their adjusted positions, rearwardly extending side plates secured to the rear ends of said bars having openings therein, attaching straps extending through said openings carrying a body pad, and an attaching strap secured to the rear end of said table, said straps being adapted to encircle the body of the operator to support the device in operative position, substantially as and for the purpose set forth.

In testimony whereof I hereunto affix my signature in the presence of two witnesses.

WILLIAM W. JORDAN.

Witnesses:
WILLIAM A. FROST,
J. W. SADLER.